United States Patent [19]

Olliges et al.

[11] 3,752,483

[45] Aug. 14, 1973

[54] TAPE CASSETTE CHANGER SYSTEM

[75] Inventors: William E. Olliges, Chicago; Edward L. Polanek, Glendale Heights; Robert Gurney, Chicago, all of Ill.

[73] Assignee: Universal Research Laboratories, Incorporated, Elk Grove Village, Ill.

[22] Filed: Sept. 25, 1970

[21] Appl. No.: 75,359

[52] U.S. Cl. ................. 274/4 F, 318/468, 340/162, 340/365

[51] Int. Cl. ............................................ G11b 23/12

[58] Field of Search................. 318/468; 307/252 K, 307/221 B; 274/4 F; 352/6–8, 123; 353/15, 19; 179/100.2 Z, 100.2 M, 100.2 D; 242/180, 181, 197–200

[56] References Cited

UNITED STATES PATENTS

| | | | |
|---|---|---|---|
| 3,359,665 | 12/1967 | Gerry | 274/4 F |
| 3,511,940 | 5/1970 | Lemelson | 274/4 F |
| 3,383,156 | 5/1968 | Fried et al. | 274/4 F |
| 3,484,055 | 12/1969 | Raine | 274/4 F |
| 2,918,656 | 12/1959 | Nolde | 340/162 |
| 3,431,367 | 3/1969 | Nickl | 274/4 F |
| 3,001,025 | 9/1961 | Gaubert | 179/100.2 Z |
| 2,621,241 | 12/1952 | Jensen | 340/162 |
| 3,021,507 | 2/1962 | McFarland | 340/162 |

FOREIGN PATENTS OR APPLICATIONS

| | | | |
|---|---|---|---|
| 877,173 | 9/1961 | Great Britain | 274/4 F |

*Primary Examiner*—Louis R. Prince
*Assistant Examiner*—Dennis A. Dearing
*Attorney*—Lettvin & Gerstman

[57] ABSTRACT

A tape cassette playing system using a magazine holding a number of cassettes is provided, in which a tape playing carriage moves along tracks adjacent the magazine to hunt for a selected one or more of the number of cassettes. The system has a memory to store information as to the selected cassettes. When a first selected cassette is found, it is automatically removed from the magazine and moved laterally into the carriage for playing. After the first cassette has been played, it is automatically returned to the magazine and the carriage hunts for another selected cassette.

7 Claims, 8 Drawing Figures

INVENTORS
William E. Olliges
Edward L. Polanek
Robert Gurney
BY Lettvin & Gerstman
ATTORNEYS INVENTORS
William E. Olliges
Edward L. Polanek
Robert Gurney
BY Lettvin & Gerstman
ATTORNEYS INVENTORS
William E. Olliges
Edward L. Polanek
Robert Gurney
BY Lettvin & Gerstman
ATTORNEYS INVENTORS
William E. Olliges
Edward L. Polanek
Robert Gurney
BY Lettvin & Gerstman
ATTORNEYS

PATENTED AUG 14 1973 3,752,483

SHEET 5 OF 5

INVENTORS
William E. Olliges
Edward L. Polanek
Robert Gurney
BY Lettvin & Gerstman
ATTORNEYS

TAPE CASSETTE CHANGER SYSTEM

FIELD OF THE INVENTION

This invention relates to an automatic system for hunting and playing a selected one or more of a number of tape cassettes located in a magazine. Disclosed herein are a novel tape cassette playing apparatus, a novel magazine for holding a plurality of tape cassettes and novel circuitry for use in a system for determining and storing information as to the distance of travel of a movable member.

BACKGROUND OF THE INVENTION

The use of tape cassettes for both audio and visual purposes has prompted the need for automatic equipment for playing such cassettes. Various types of cassette changers are on the market today, in which a number of cassettes are stacked and played sequentially in cassette playing apparatus.

In certain circumstances, however, it is very desirable to have the ability to automatically select one or more predetermined cassettes from a magazine containing a number of cassettes. For example, using such selection, audio cassette playing apparatus and its associated cassette magazine could be placed in the trunk of a car with the manually operable selector switches connected to the dashboard of the car. In this manner, it would be unnecessary to have burdensome apparatus provided adjacent the driver and theft of such playing apparatus may be alleviated. Further, such selection equipment will obviate the need to stack a number of cartridges in a predetermined order or the need manually to place a selected cassette in the playing apparatus.

It is, therefore, an object of the present invention to provide a tape cassette playing apparatus which can be programmed to select a predetermined cassette from a magazine holding a number of cassettes.

It is a further object of the present invention to provide a tape cassette playing apparatus including hunting circuit means for programming a carriage motor to enable the carriage to hunt and align the tape playing apparatus with any selected one of a plurality of cassettes, and to automatically move the selected cassette to and from the playing apparatus.

Another object of the present invention is to provide a tape cassette playing apparatus which has a memory that enables one or more cassettes to be selected, hunted, retrieved and played automatically from a magazine carrying a number of cassettes, and which is relatively simple and efficient in construction.

A further object of the present invention is to provide an effective circuit for determining and storing information as to the distance of travel of a movable member, such as a tape cassette playing carriage which moves parallel to a magazine containing a number of cassettes.

BRIEF DESCRIPTION OF THE INVENTION

In accordance with the present invention, there is provided a tape cassette playing apparatus which includes a magazine for holding a plurality of cassettes horizontally with the cassette bodies standing vertically. The apparatus also includes a tape playing carriage defining a recess adjacent to which are positioned means for driving the tape reel of a cassette and an associated playing head. Means are provided for relatively moving the carriage and magazine and hunting circuit means are provided for programming the moving means to enable the carriage to hunt and align any selected one of the plurality of cassettes with the recess. Finger-like means are aoosicated with the carriage for engaging the selected cassette and moving it laterally into the recess from the magazine for playing and back into the magazine from the recess after playing.

In the illustrative embodiment of the invention, the carriage is movable while the magazine remains stationary and the apparatus includes track means for movable support of the carriage. Rack means lie adjacent and parallel to the track means, and pinion means carried by the carriage are engageable with the rack means for providing a carriage drive along the track means.

In the illustrative embodiment, the finger-like means comprise a pair of fingers extending vertically from the carriage with the fingers being horizontally spaced from each other a distance that is greater than the width of a cassette and lying substantially in a vertical plane. The fingers become aligned on opposite ends of the cassette and means are carried by the carriage for moving the fingers laterally in both directions to move the cassette to and from the playing recess.

The cassette magazine of the illustrative embodiment comprises a plurality of vertical spacers on a common horizontal base. The spacers are equally spaced from each other a distance slightly in excess of the thickness of a cassette and are positioned to hold a plurality of cassettes horizontally with the cassette bodies standing vertically and with the tape access ends of all of the cassettes lying in a single vertical plane. The spacers form a rack with an open end for cooperating with the tape access ends to permit movement of the cassettes from and to the magazine via the open end.

The illustrative embodiment of the present invention also includes a system for determing and storing information as to the distance of travel of a movable member including a motor drive. The system includes a plurality of switching banks, each of which comprises a plurality of gated semiconductor switches. A first series of interlocked manually operable switches normally prevents triggering the gated semiconductor switches, with each switch of the first series being operable to permit the gated semiconductor switch of one selected switching bank to be triggered. A second series of manually operable switches is provided, each of which is operable to trigger the gate of a selected one of the gated semiconductor switches of each bank. Hence actuation of one switch of the first series and one switch of the second series will cause triggering and thus conduction of one selected gated semiconductor switch while the other semiconductor switches remain nonconductive. Likewise, actuation of another combination of the two series of switches will cause triggering of another selected gated semiconductor switch.

Separate output contact means are connected to each of the gated semiconductor switches and are spaced in a predetermined manner along the path of travel. Means are connected to the output contact means for operating the motor drive and means are carried by the movable member for wiping the output contact means. In this manner, operation of the motor drive is responsive to engagement of the wiping means with the respective output contact means connected to the conductive gated semiconductor switches.

In the illustrative embodiment, each of the gated semiconductor switches is an SCR and each of the SCR's is normally clamped to prevent triggering, with each one of the switches of the first series being operable to unclamp all of the SCR's in one bank while the other SCR's remain clamped.

A more detailed explanation of the invention is provided in the following description and claims, and is illustrated in the accompanying drawings.

DETAILED DESCRIPTION OF THE ILLUSTRATIVE EMBODIMENT

Figure 1:
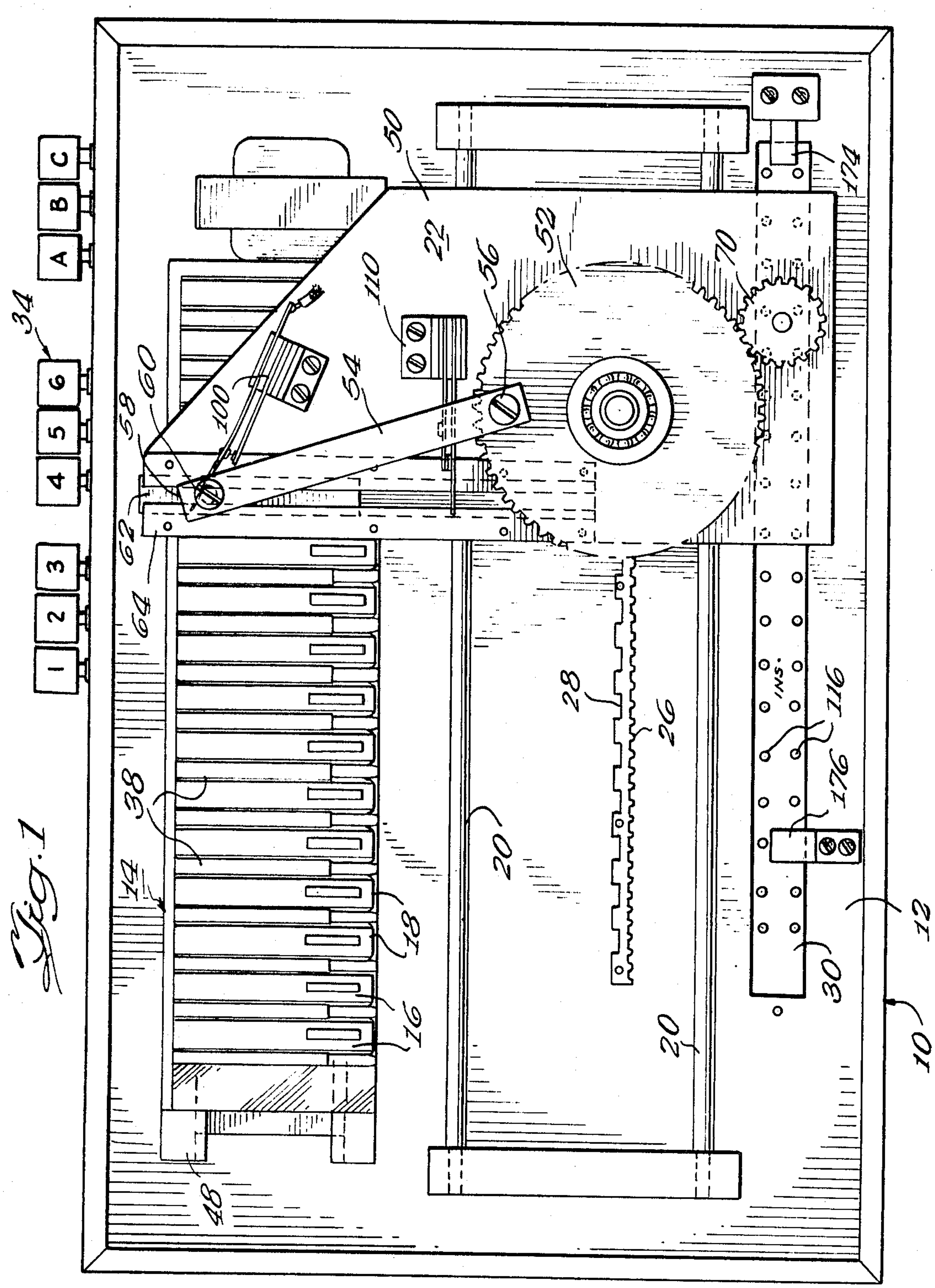
FIG. 1 is a top plan view of a tape cassette playing system constructed in accordance with the principles of the present invention.

Referring to the drawings, the tape cassette playing apparatus 10 includes a base 12 on which is positioned a magazine 14 carrying a number of conventional tape cassettes 16, all of which are held horizontally with the cassette bodies standing vertically and with the tape access ends 18 of all of the cassettes lying in a single vertical plane. In the illustrative embodiment, the magazine holds 18 tape cassettes. A pair of tracks 20 are provided for movably supporting a tape playing carriage 22 which slides back and forth on tracks 20. A pinion carried by the carriage 22 engages the teeth 26 of a rack 28, which rack is fastened to base 12. A contact strip 30 is fastened to base 12 for contact with a wiper member carried by carriage 22, as will be described in more detail below. Manual buttons 34 are connected to the unit for actuating selector switches, the operation of which is described below. It can be seen that tracks 20, rack 28 and contact strip 30 all lie parallel to magazine 14 to permit carriage 22 to travel along side of magazine 14, in order for the playing deck to be aligned with a selected cassette.

Figure 2:
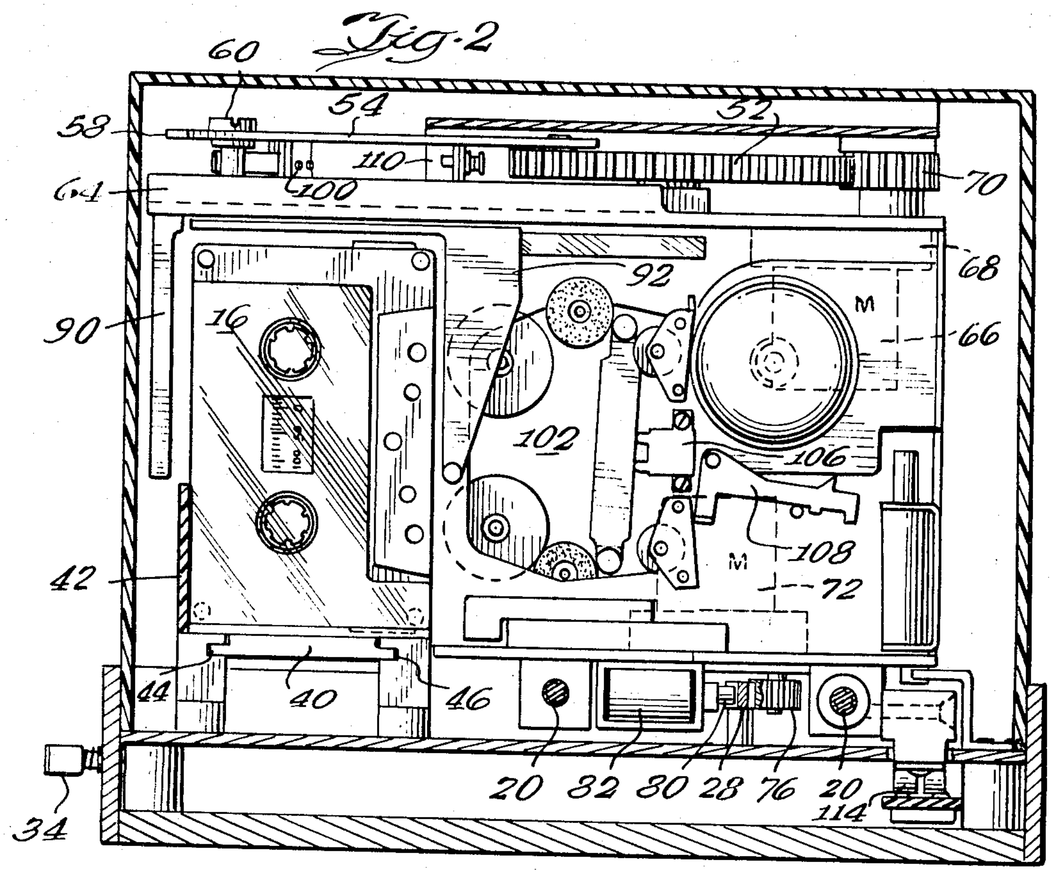
FIG. 2 is an elevational view thereof, taken from the left side of FIG. 1.
Figure 4:
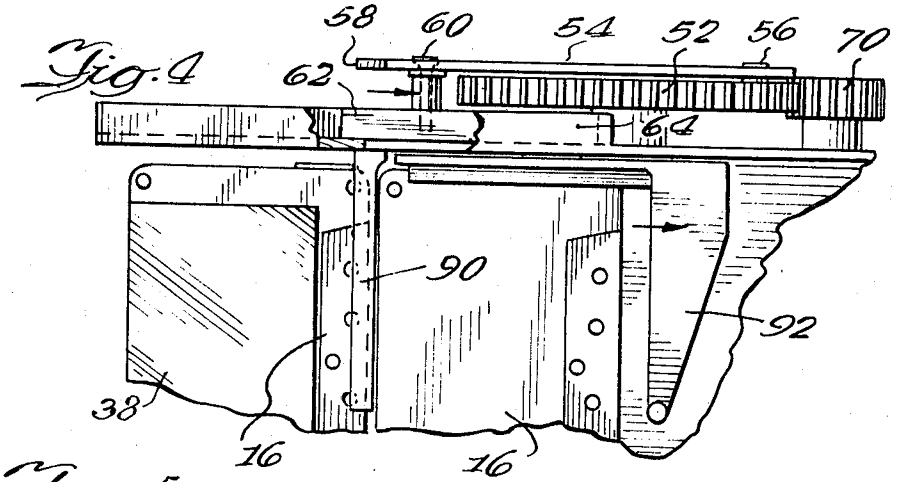
FIG. 4 is a fragmentary view of a portion of the system of FIG. 2, showing the movement of a cassette from its magazine location to the playing apparatus.
Figure 5:
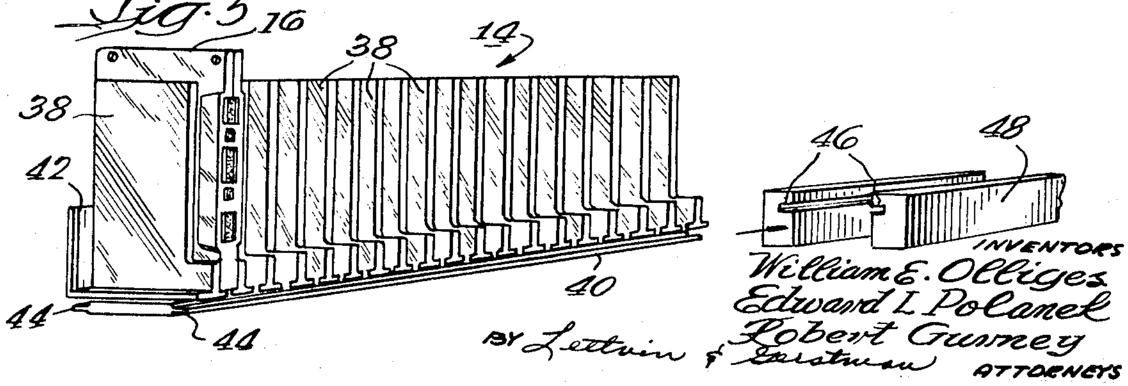
FIG. 5 is a perspective view of a cassette magazine constructed in accordance with the present invention and showing in fragmentary form a member for receiving the magazine.
Figure 3:
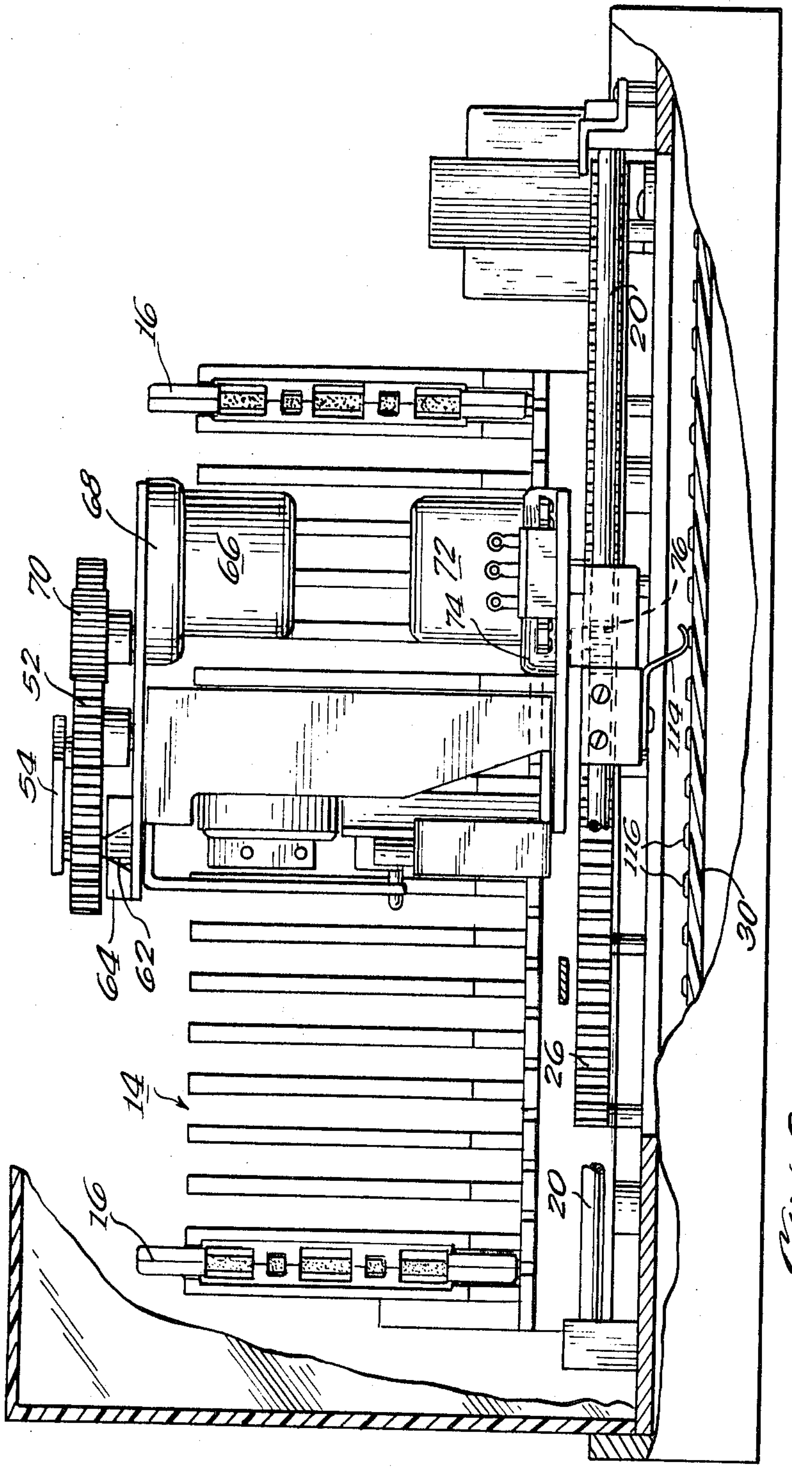
FIG. 3 is an elevational view thereof, taken from the front of FIG. 1, with portions broken away for illustrative purposes.
Figure 6:
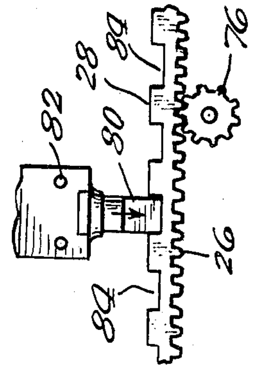
FIG. 6 is an enlarged fragmentary top plan view of a carriage locking mechanism in accordance with the principles of the present invention.

The tape magazine 14 comprises a number of vertical spacers 38 on a common horizontal base 40 with the spacers being equally spaced from each other a distance slightly in excess of the thickness of a cassette 14. The rear end of the magazine has a flange 42 which extends vertically to block the cassette from moving further than a predetermined location in the magazine, and the end of the magazine facing the playing apparatus is opened to permit movement of the cassettes from and to the magazine via the open end. As seen most clearly in FIGS. 2 and 5, base 40 of the magazine comprises a depending horizontally extending member having opposite extending tongues 44 for slidable engagement within grooves 46 of magazine support member 48 which is fastened to base 12. Using this tongue and groove engagement system, the magazine 14 can be slid horizontally in and out of member 48 for rapid magazine substitution.

The tape playing carriage 22 comprises a housing having a top plate 50 and carrying thereon a crank comprising a rotatable disc 52 and a lever 54 fastened by bolt 56 to a point on disc 52 lying outside of the center thereof. The distal end 58 of lever 54 is fastened by means of a plastic pin 60 to a slider 62 which rides in a groove defined by a laterally extending track 64. Rotational movement of disc 52 causes lateral movement of slider 62 within the groove defined by the track 64. Such rotation is imparted by means of a motor 66 which drives the gears within gearbox 68 thereby driving disc 52 through gear 70 which is keyed to the output shaft of gearbox 68. The drive of carriage 22 is accomplished by energizing motor 72 which drives the gears within gearbox 74 to turn pinion 76 which is keyed to the output shaft of gearbox 74. The teeth of pinion 76 cooperate with the teeth of rack 28 to move the carriage along tracks 20.

Once the carriage is properly aligned with a selected cassette, motor 72 will be deenergized in a manner described below and the arm 80 of solenoid 82 will be released to enter one of the grooves 84 defined by the side of rack 28 opposite to the side which defines teeth 26. Grooves 84 are spaced a distance equal to the distance between adjacent cassettes and engagement of arm 80 with one of the grooves 84 provides a locking engagement of a carriage in place along side of the selected cassette.

A pair of downwardly extending vertical fingers 90 and 92 are fastened to slider 62 for lateral movement during rotation of disc 52. Fingers 90 and 92 are spaced a distance greater than the width of the cassette so that as carriage 22 moves along tracks 20, as shown most clearly in FIG. 2 the fingers will each be on opposite ends of the cassette whereby the carriage can move along the tracks free of contact with any one of the cassettes. When the fingers are in the position shown in FIG. 2, pin 60 will hold the contacts of limit switch 100 open, thereby maintaining the cassette selector circuit in its hunting condition. Once a predetermined selected cassette is found, motor 72 will be deenergized to stop movement of the carriage, arm 80 of solenoid 82 will extend into the corresponding groove 84, and motor 66 will be energized to cause disc 52 to be driven thereby moving distal end 58 of lever 54 inwardly. This will cause finger 90 to pull the selected cassette into a recess 102 (FIG. 2) defined by the playing apparatus. Behind the recess is positioned conventional cassette playing apparatus, for example Garrard model C2 cassette playing deck, for locking in place and playing the selected cassette 16. The conventional playing deck includes means for driving the tape reels of the cassette and an associated playing head 106 in addition to a solenoid operated latch 108 for holding the cassette in playing position.

When the cassette is in playing position within recess 102, pin 60 opens the contacts of limit switch 110 to deenergize motor 66. After the cassette has been played, or if reject is desired, a reject mechanism operates to bypass the contacts of limit switch 110 to close the motor circuit and thereby energize motor 66 so that disc 52 will rotate to cause the cassette to be removed from recess 102 by means of finger 92 and pushed back into its slot in the magazine 14.

As stated above, the selected cassette is found when wiper arm 114 carried by the carriage 22 shorts one of the pairs of contacts 116 along contact strip 30. The shorting of the pair of contacts 116 corresponding to the selected tape cassette will cause energization of a trip relay to effectively deenergize motor 72 and energize motor 66.

Figure 7:
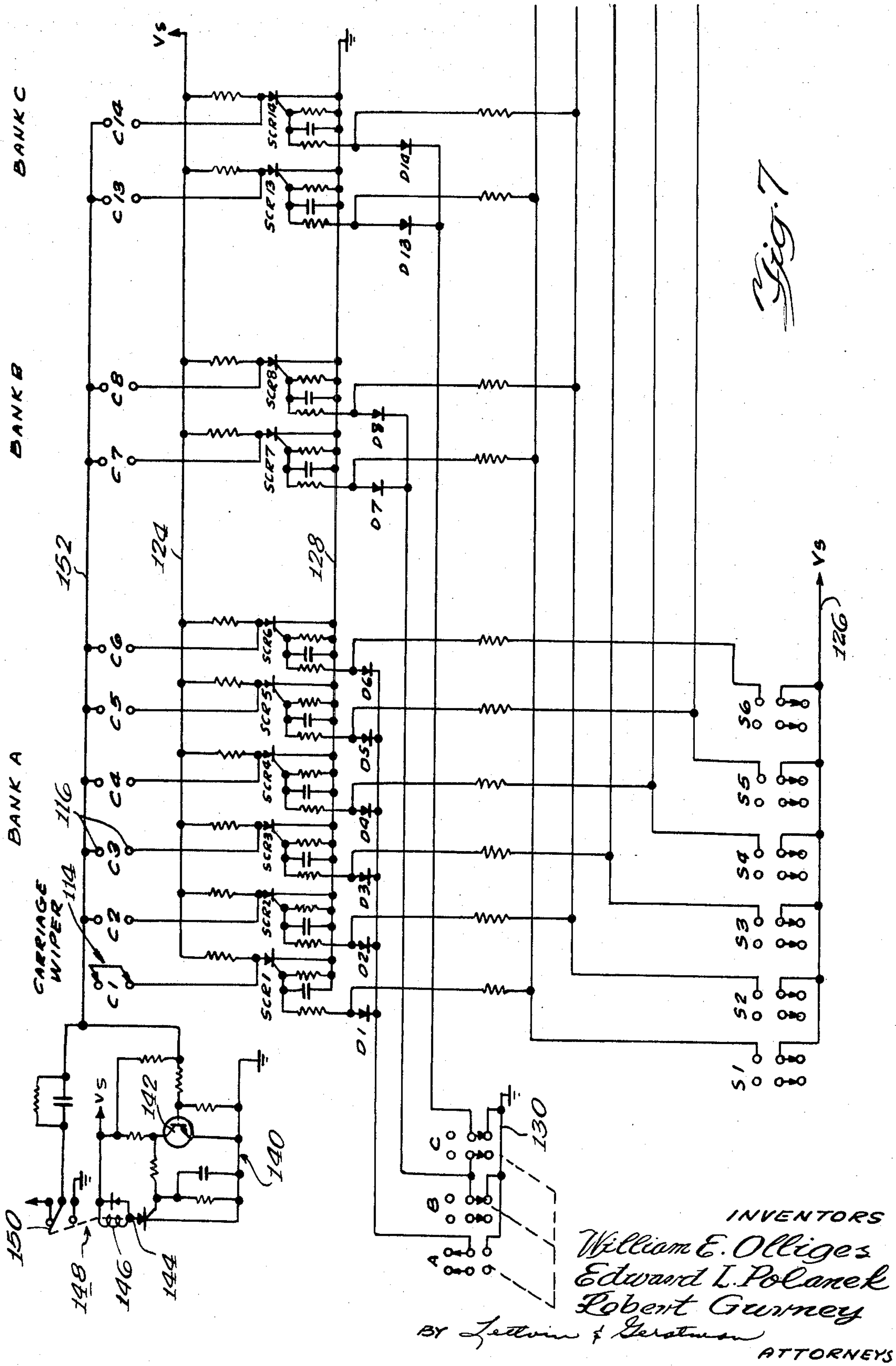
FIG. 7 is a schematic circuit diagram of a motor control circuit according to the principles of the present invention.

Referring to FIG. 7, the circuit shown therein includes three banks of silicon controlled rectifiers (SCR's), each bank being identical to the other and containing six SCR's. Only Bank A is shown complete for illustrative purposes in FIG. 7.

Bank A comprises SCR 1 to SCR 6, Bank B comprises SCR 7 to SCR 12 and Bank C comprises SCR 13 to SCR 18. All of the SCR's are normally clamped by respective diodes D 1 to D 18 to effectively prevent triggering thereof. The supply voltage is connected across supply lines 124, 126 and grounded lines 128 and 130. So long as switches A, B and C remain downward (as switches B and C are indicated in FIG. 7) the SCR's cannot be triggered but if one of the switches is actuated (see actuated switch A in FIG. 7) all of the gate circuits of the respective bank of SCR's are unclamped to enable the respective SCR's to be triggered. The switches are of the interlocked type, that is, when one is pressed closed, the others open automatically.

In the circuit of FIG. 7, switch A has been actuated so that the SCR's in Bank A have the ability to be triggered. Trigger voltage is provided at the gate by actuating one of switches S1 to S6. Since diodes D 1 to D 6 are rendered nonconductive by actuating switch A, actuation of switch S 3, for example, will trigger SCR 3 to conduct. Immediately after switch A and switch S 3 are actuated, switch B and switch S 1 may be actuated to render SCR 7 conductive. Both SCR 3 and SCR 7 will remain in conduction until their respective anodes are grounded.

As explained above, contacts 116 are on a contact board 30 which is wiped by carriage wiper 114 as the carriage travels along tracks 20. One of each pair of contacts 116 is connected to the anode of one of the SCR's so that once the pair of contacts corresponding to the conductive SCR is wiped, a detection circuit 140 will be energized. For example, when SCR 3 and SCR 7 are conducting and carriage wiper 114 wipes contacts C 3, the circuit parameters of NPN transistor 142 are selected so that transistor 142 is biased to nonconduction. The collector of transistor 142 will then become more positive to trigger SCR 144 which is in series with winding 146 of trip relay 148. The arm 150 of relay 148 will be connected to ground thereby deenergizing motor 72 and energizing motor 66, indicating that the carriage has found the selected cassette, and the cassette will not be moved into the playing deck by finger 90 as described above.

When arm 150 is grounded, ground potential will be applied on 152 which is connected through wiper 114 to the anode of SCR 3, effectively causing SCR 3 to stop conducting and thereby resetting its circuit. This further biases transistor 142 into conduction. When motor 66 is energized and lever 54 moves inwardly to close the contacts of limit switch 100, the limit switch is connected to ground the anode of SCR 144 thereby resetting the detection circuit 140

After the cassette is played and returned to the magazine, opening of limit switch 100 by pin 60 will allow the carriage to continue to hunt for the next selected cassette. When wiper 114 shorts contacts C7, since SCR 7 is still conductive the NPN transistor 142 will be nonconductive to actuate trip relay 148, thereby moving the next selected cassette into the playing deck in the same manner as described above.

Figure 8:
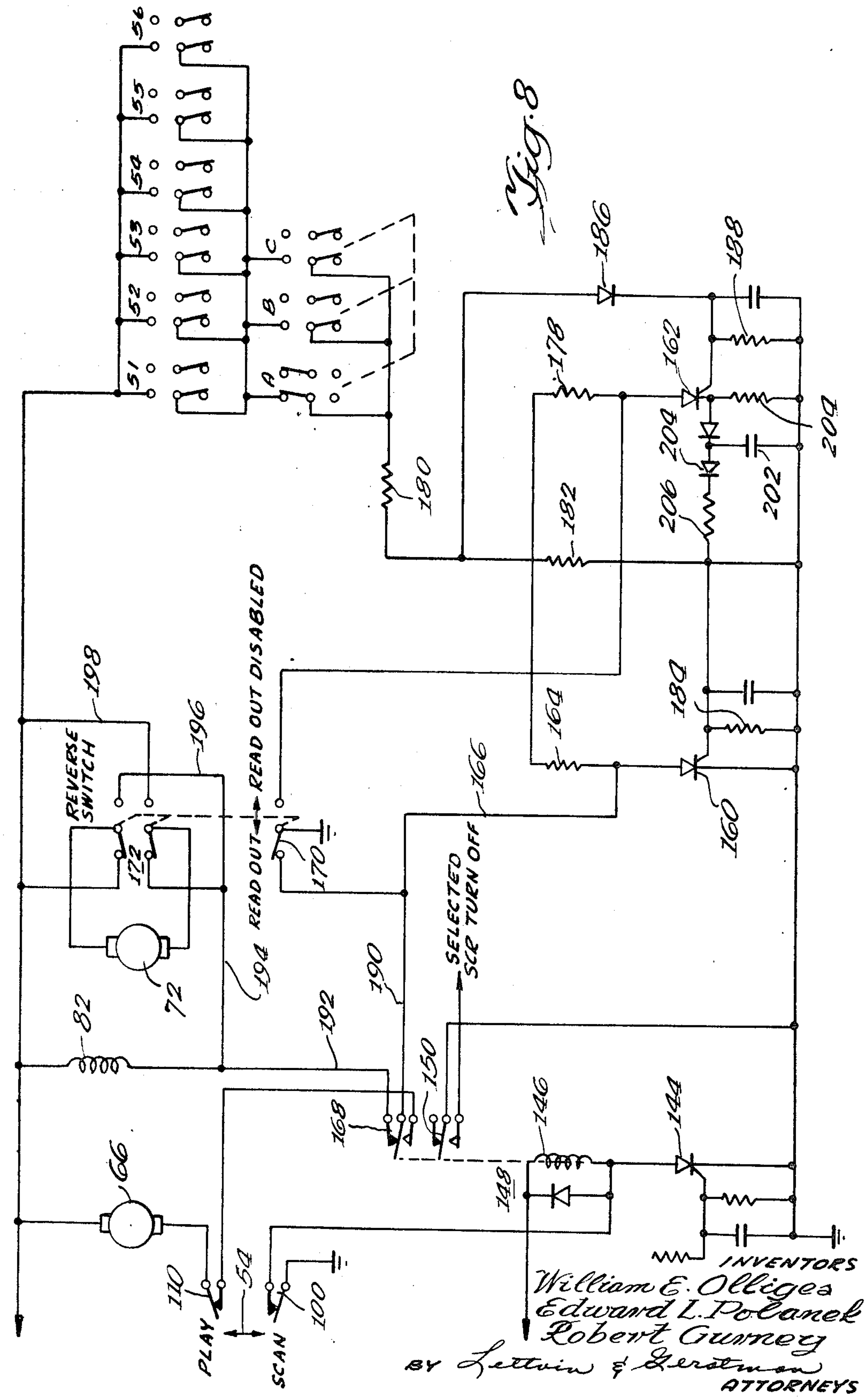
FIG. 8 is a schematic circuit diagram of a selectable cassette play control circuit according to the principles of the present invention.

The selectable cassette play control circuit is shown in FIG. 8. Referring to FIG. 8, switches S1 through S6 are shown connected through switches A, B and C to the gates of a silicon controlled rectifier 160 and a silicon controlled rectifier 162. The anode of SCR 160 is connected to a positive voltage source through resistor 164 and is also connected via line 166 to the arm 168 of trip relay 148 and to ground when readout switch 170 is in the position shown in FIG. 8. Switch 170 is ganged to reverse switch 172 which is operated in the direction shown in FIG. 8 when the switch 172 carried by the carriage 22 engages contact 174 (FIG. 1) and is in the other position when the reverse switch 172 engages contact 176 when the carriage has moved in the opposite direction. The anode of SCR 160 is connected through resistor 178 to a positive voltage source.

Scan motor 72 is connected across one set of contacts of reverse switch 172 and cassette motor 66 is connected between a positive voltage source and limit switch 110. The operation of the circuit illustrated in FIG. 8 is as follows:

Assume that the carriage 22 is in a "standby" state — that is, it is not scanning to select a cassette nor is it playing a cassette. In its "standby" state, switch 170 is in the "readout-disabled" position and SCR 160 and SCR 162 are nonconductive. At this time, the carriage is located at the extreme left as viewed with respect to FIG. 1.

When a letter-numbered button combination on the selector panel is selected, trigger voltage is applied to the gate of SCR 160 through the series selection switches (e.g., switches S3 and A), resistor 180, resistor 182, and resistor 184, and trigger voltage is applied to the gate of SCR 162 through resistor 180, diode 186, and resistor 188. Because the anode of SCR 162 is at ground potential due to switch 170 being in the "readout-disabled" position, only SCR 160 can switch to the conductive state. Motor 72 will be energized via SCR 160, line 166, line 190, arm 168, line 192, line 194, line 196, motor 72, and line 198. Solenoid 82 will pull in arm 80 to allow the carriage to move. The carriage 22 will proceed from left to right (with respect to FIG. 1). At the end of the scan, switch 172 will engage contact 174 for reversal and the carriage will proceed from the right (with respect to FIG. 1) to the extreme left (with respect to FIG. 1), which direction is considered the "read-out" direction. Switch 170 will be in the position shown in FIG. 8 and current to detent solenoid 82 and to the scan motor 72 will be supplied through switch 170, line 190, and line 192.

When a selected cassette is located in the manner described above, trip relay 148 is energized and arms 150 and 168 are actuated. The detent solenoid 82 is deenergized thereby releasing arm 80 into an adjacent groove 84, scan motor 72 is deenergized and cassette motor 66 is energized through arm 168 causing the selected cassette to be moved to the "play" position. When crank lever 54 opens limit switch 110, motor 66 will be deenergized and the cassette will be played in the conventional playing deck.

After the selected cassette is played or when a reject switch is actuated, motor 66 is energized to deliver the selected cassette back to the magazine. At the completion of this action, limit switch 100 is opened releasing trip relay 146 and returning arms 150 and 168 to the position shown in FIG. 8. The carriage will now begin to hunt in search of another selection.

If no other selection had been made, the carriage would proceed in the "readout" direction (from right to left with respect to FIG. 1) to the end of the track where reverse switch 172 would switch to the "readout-disabled" direction thereby causing the carriage to be in a "standby" state. On the other hand, if a selection were made while the carriage were travelling in the "readout" direction, SCR 162 would be triggered to its conductive state through the series selection switches, resistor 180, diode 186 and resistor 188. SCR 160 would not be triggered to its conductive state because its anode is at ground potential through the arm of switch 170 which is in the "readout" position. With SCR 162 in its conductive state, capacitor 202 charges to approximately the potential developed across resistor 204 and stores this charge until the carriage proceeds to the end of the track and the arm of switch 170 switches to the "readout disabled" direction.

When switch 170 is in the "readout disabled" direction, SCR 162 is switched to its nonconductive state and the stored charge on capacitor 202 discharges through diode 204, resistor 206 and resistor 184, triggering SCR 160 to its conductive state. The carriage will again search for the slection made, play the selected cassette, return it to the magazine, and if no other selections are made, the carriage will proceed in the "readout" direction to the end of the track. At the end of the track, switch 170 will reverse and because both SCR 160 and SCR 162 will be in their nonconductive states, the carriage will be in its "standby" state (at the extreme left with respect to FIG. 1) until the cycle is again initiated.

It is seen that a system is provided which enables a trap playing carriage to hunt for one or more selected cassettes to be played, and to automatically insert the selected cassette into the playing deck. This circuit has a memory and automatic reset feature, and operates to energize and deenergize the carriage drive motor and the motor controlling the mechanism for moving the selected cassette laterally.

Although an illustrative embodiment of the invention has been shown and described, it is to be understood that various modifications and substitutions may be made by those skilled in the art without departing from the novel spirit and scope of the present invention.

What is claimed is:

1. A tape cassette playing apparatus which comprises: a magazine for holding a plurality of cassettes with the cassette bodies standing vertically; a tape playing carriage defining a recess adjacent to which are positioned means for driving the tape reels of a cassette and an associated playing head; a motor for relatively moving said carriage and magazine; hunting circuit means for programming said motor to enable said carriage to hunt and align any selected one of said plurality of cassettes with said recess; said hunting circuit means including a plurality of switching banks, each comprising a plurality of gated semiconductor switches; a first series of manually operable switches normally preventing triggering of said gated semiconductor switches with each manually operable switch of said first series being operable to permit the gated semiconductor switches of one selected switching bank to be triggered; a second series of manually operable switches each of which switches is operable to trigger a selected one of the gated semiconductor switches of each bank, whereby actuation of one switch of said first series and one switch of said second series will cause triggering and thus conduction of one selected gated semiconductor switch; means carried by one of the carriage and magazine for cooperating with the triggered semiconductor switch whereby operation of the motor is responsive to the cooperation of said cooperating means with the triggered semiconductor switch; and means associated with said carriage for engaging said selected cassette and moving it laterally into said recess from said magazine for playing and back into said magazine from said recess after playing.

2. Apparatus as described in claim 1 in which said carriage moves while said magazine remains stationary and including track means for movable support of said carriage; a rack lying adjacent and parallel to said track means; pinion means carried by said carriage and engageable with said rack for providing a carriage drive along the track means; and means carried by said carriage for driving said pinion means.

3. Apparatus as described in claim 2, wherein said rack means defines notches therealong spaced from each other the spacing distance of adjacent cassettes from each other, and means actuable in response to alignment of said finger means with a selected cassette for engaging one of said notches to lock the carriage in position for playing the selected cassette.

4. Apparatus as described in claim 1, wherein said magazine comprises a plurality of parallel vertical spacers on a common horizontal base whereby the tape access ends of all of the cassettes placed therein lie in a single vertical plane, said spacers being equally spaced from each other a distance slightly in excess of the thickness of a cassette, said spacers forming a rack with an open end to permit lateral movement of the cassettes from and to the magazine via said open end.

5. Apparatus as described in claim 4, wherein the carriage is movable along a track and including magazine holder means positioned adjacent and parallel to said track, said magazine's horizontal base and said magazine holder means having a cooperating flange and groove arrangement for enabling sliding said magazine into position adjacent said track.

6. Apparatus as described in claim 1 comprising separate output contact means connected to each of said gated semiconductor switches and being spaced in a predetermined manner along the path of relative movement of the carriage and magazine; means connected to said output contact means for operating the motor; and means carried by one of the carriage and magazine for cooperating with the output contact means, whereby operation of the motor is responsive to cooperation of the cooperating means with the respective output contact means connected to the conductive gated semiconductor switch.

7. A tape cassette playing apparatus which comprises: a magazine for holding a plurality of cassettes horizontally with the cassette bodies standing vertically; a tape playing carriage defining a recess adjacent to which are positioned means for driving the tap reels of a cassette and an associated playing head; means for relatively moving said carriage and magazine; hunting circuit means for programming said moving means to enable said carriage to hunt and align any selected one of said plurality of cassettes with said recess; said hunting circuit means including means for storing information as to more than one selected cassette whereby said moving means can be programmed to enable said carriage to hunt for additional cassettes after said one selected cassette has been played, said hunting circuit means including a plurality of switching banks, each comprising a plurality of gated semiconductor switches; a first series of interlocked manually operable switches normally preventing triggering of said gated semiconductor switches with each switch of said first series being operable to permit the gated semiconductor switches of one selected switching bank to be triggered; a second series of manually operable switches each of which switches is operable to trigger the gate of a selected one of the gated semiconductor switches of each bank, whereby actuation of one switch of said first series and one switch of said second series will cause triggering and thus conduction of one selected gated semiconductor switch while the other semiconductor switches remain nonconductive; separate output contact means connected to each of said gated semiconductor switches and being spaced in a predetermined manner along the path of relative movement of the carriage and magazine; means connected to said output contact means for operating the means for relatively moving said carriage and magazine; means carried by one of the carriage and magazine for wiping the output contact means, whereby operation of the relatively moving means is responsive to engagement of the wiping means with the respective output contact means connected to the conductive gated semiconductor switch; and finger-like means associated with said carriage for engaging said selected cassette and moving it laterally into said recess from said magazine for playing and back into said magazine from said recess after playing.

* * * * *

UNITED STATES PATENT OFFICE
CERTIFICATE OF CORRECTION

Patent No. 3,752,483 Dated August 14, 1973

Inventor(s) William E. Olliges, Edward L. Polanek and Robert Gurney

It is certified that error appears in the above-identified patent and that said Letters Patent are hereby corrected as shown below:

Column 2, line 5, "aoosicated" should be -- associated --.

Column 7, line 48, "trap" should be -- tape --.

Column 9, line 7, "tap" should be -- tape --.

Signed and sealed this 26th day of February 1974.

(SEAL)
Attest:

EDWARD M.FLETCHER,JR.
Attesting Officer

C. MARSHALL DANN
Commissioner of Patents